(12) United States Patent  (10) Patent No.: US 6,547,402 B2
Masuda  (45) Date of Patent: Apr. 15, 2003

(54) PROJECTION LENS SHIFTING MECHANISM

(75) Inventor: Naoki Masuda, Minato-ku (JP)

(73) Assignee: NEC Viewtechnology, Ltd., Tokyo (JP)

( * ) Notice: Subject to any disclaimer, the term of this patent is extended or adjusted under 35 U.S.C. 154(b) by 0 days.

(21) Appl. No.: 10/109,881

(22) Filed: Apr. 1, 2002

(65) Prior Publication Data

US 2002/0154278 A1 Oct. 24, 2002

(30) Foreign Application Priority Data

Apr. 6, 2001 (JP) .................................. 2001-108740
Aug. 3, 2001 (JP) .................................. 2001-236767

(51) Int. Cl.$^7$ .............................................. G02F 1/13
(52) U.S. Cl. ........................................ 353/101; 353/100
(58) Field of Search .............................. 353/100, 101; 359/813, 822, 827

(56) References Cited

U.S. PATENT DOCUMENTS

| | | | | |
|---|---|---|---|---|
| 4,655,548 A | * | 4/1987 | Jue | 348/373 |
| 5,194,993 A | * | 3/1993 | Bedzyk | 359/813 |
| 5,250,968 A | * | 10/1993 | Numata et al. | 353/101 |
| 5,465,126 A | * | 11/1995 | Fukuda et al. | 353/101 |
| 5,537,167 A | * | 7/1996 | Toide et al. | 353/100 |
| 5,585,867 A | * | 12/1996 | Ooya | 348/781 |

FOREIGN PATENT DOCUMENTS

| | | |
|---|---|---|
| JP | 5-21246 U | 1/1993 |
| JP | 5-107434 A | 4/1993 |
| JP | 5-196888 A | 8/1993 |
| JP | 5-249409 A | 9/1993 |
| JP | 9-138377 A | 5/1997 |
| JP | 11-258565 A | 9/1999 |

* cited by examiner

*Primary Examiner*—William Dowling
(74) *Attorney, Agent, or Firm*—Sughrue Mion, PLLC

(57) ABSTRACT

The projection lens shifting mechanism is for locating the projected picture at a desired position on the screen by shifting the projection lens with respect to the display surface of the display device, including a base plate secured to the housing of the projection lens shifting mechanism and having a guide surface parallel to the display surface, a moveable plate rigidly holding the projection lens and movable in a prescribed direction parallel to the display surface guided by the guide surface, a holding plate linked to the moveable plate through elastic members, constituting, together with the moveable plate, an elastic clamp structure that holds the base plate and elastically clamps the base plate. When an external force works against the elastic force to release this clamp, the holding plate can move integrally with the moveable plate in a direction parallel to the guide surface of the base plate.

9 Claims, 6 Drawing Sheets

PROJECTION LENS SHIFTING MECHANISM

BACKGROUND OF THE INVENTION

The present invention relates to a projection lens shifting mechanism of a projector apparatus for projecting a light beam from a light source such as a lamp onto a screen by way of a projection lens to make an enlarged projection of an image rendered on a display device such as a liquid crystal panel Conventionally, a liquid crystal projector apparatus, in which a liquid crystal display panel is provided, has been employed to make an enlarged projection of an image in a personal computer display or video device. The liquid crystal projector generates a light signal of a picture by transmitting or screening the light projected from the lamp light source, in response to the image of the liquid crystal display panel.

The liquid crystal display panel is made up of liquid crystal elements arranged in a two-dimensional plane on a liquid crystal panel, and a projection lens serves the enlarged projection of the image to present a picture on a screen. The projection lens is normally equipped with a cam and screw mechanism whereby the lens-barrel can be rotated to shift a part of a plurality of lenses in the direction of the optical axis to adjust focus and zoom.

The position of the projection lens in a liquid crystal projector is typically fixed with respect to the liquid crystal panel, and the position and size of the picture projected onto the screen is therefore determined by the relative positions of the screen and projector. In order to project a picture of the proper size onto the proper position of the screen, the projector must be adjusted to the proper relative position with respect to the screen, and considerable time and effort are therefore required to position the projector.

In many liquid crystal projectors, the projection lens is shifted in advance to a fixed height above the liquid crystal panel and then secured. Thus, by projecting the light beam from the fixed height shifted upward with respect to the liquid crystal panel, a picture can be projected onto a screen at a high position to facilitate viewing regardless of the height of the stand on which the projector is set up. When it is desired to shift the position of the picture on the screen still higher, the projection direction is shifted upward by means of a height adjustment mechanism attached to the forward legs of the projector. In such a case, however, since the angle between the liquid crystal panel surface and the screen surface changes, the picture that should be projected, for example, as a square is distorted to a trapezoid. To eliminate this distortion, the inclination of the screen must be adjusted according to the inclination of the liquid crystal panel, and it was therefore necessary to provide a screen having a tilting mechanism.

To solve this problem, some high-function liquid crystal projectors are provided with a mechanism for electric-powered shifting of the projection lens by means of, for example, a motor. However, such devices necessitate a complex mechanism to enable vertical and horizontal movement while accurately holding the heavy projection lens. This requirement results in an increase in cost. The following examples have been proposed in the prior art as liquid crystal projectors provided with mechanisms for moving the projection lens.

A liquid crystal projector is disclosed in Japanese Utility Model Laid-open No. 21246/1993 (hereinbelow referred to as the first example of the prior art) in which a projection lens is supported by a pantograph mechanism constituted by four control links and in which rotating of a dial drives the pantograph mechanism to enable vertical movement of the projection lens.

A method of adjusting the alignment of a liquid crystal panel in a liquid crystal projector is disclosed in Japanese Patent Laid-open No. 107434/1993 (hereinbelow referred to as the second example of the prior art). According to this method, a liquid crystal panel holding part is constituted by a bracket secured to a base plate and a liquid crystal attachment plate secured to this bracket by means of securing screws. A jig is used for shifting the liquid crystal attachment plate with respect to the bracket, and after adjusting the position of the liquid crystal attachment plate by means of adjustment screws of the jig, the bracket and liquid crystal attachment plate are secured by the securing screws. The jig is then removed.

A projection display device in which the projection lens can be moved vertically by means of a projection-lens moving mechanism is disclosed in Japanese Patent Laid-open No. 196888/1993 (hereinbelow referred to as the third example of the prior art). This projection-lens moving mechanism is provided with a lead screw that is rotatably borne by a housing and a projection-lens holding member having a threaded hole that engages with this lead screw such that the projection-lens holding member moves up and down with rotation of this lead screw. This lead screw is provided with a knob for rotating the screw. The projection lens holding member, being accommodated inside the housing, can both hold the projection lens and translate while being guided vertically by the rotation of the lead screw. The projection lens holding member is thus movable vertically by rotating the knob.

A liquid crystal projector is disclosed in Japanese Patent Laid-open No. 249409/1993 (hereinbelow referred to as the fourth example of the prior art) in which a projection lens is installed in a projector body so as to allow horizontal and vertical movement of the projection lens by magnetic force or by leaf springs and in which the user applies force manually against the projection lens to move the projection lens.

A liquid crystal projector is disclosed in Japanese Patent Laid-open No. 138377/1997 (hereinbelow referred to as the fifth example of the prior art) in which light from a light source is collimated by a first condenser lens to a substantially parallel light beam and incident on a liquid crystal panel, this light beam is optically modulated in response to a video signal that is externally supplied to the liquid crystal panel, and the modulated light beam emitted from the liquid crystal panel is then condensed by a second condenser lens to enter a projection lens to present a picture on a screen. In this liquid crystal projector, when the position of projection on the screen is to be moved up and down, a motor provided for shifting the projection lens is activated and a link mechanism that supports the projection lens is moved in a vertical direction.

A liquid crystal projector is disclosed in Japanese Patent Laid-open No. 258565/1999 (hereinbelow referred to as the sixth example of the prior art) in which pictures from two projectors are superimposed on each other on a screen in order to brighten the picture projected on the screen. In the lens moving mechanism for shifting the position of projection on the screen, a lead screw rod is rotatably attached to the housing of the liquid crystal projector and a nut to be engaged with the lead screw is secured to the lens-barrel of the projection lens. When the lead screw rod is rotated by operating a control member provided on the side surface of the housing, the nut moves to cause the lens-barrel to move in a vertical direction. This lens moving mechanism is basically equivalent to the previously described third example of the prior art, but differs from the third example of the prior art in that the lead screw rod tilts forward. The reason for this is to compensate for change in the size of the projected picture that is brought about by a change in the distance between the liquid crystal panel and projection lens caused by the vertical movement of the projection lens.

Thus, although a number of liquid crystal projectors provided with projection lens moving mechanisms have been proposed in the prior art, the projection lens moving mechanism disclosed in the first example of the prior art has the problem of large-scale structure resulting from the use of a pantograph mechanism. The second example of the prior art is a method of adjusting the alignment of a liquid crystal panel and therefore has an object differing from that of the present invention, which is directed to adjusting the position of the projection lens. The second example of the prior art is further directed to using a jig to make a single initial adjustment of the liquid crystal panel and is not directed to a construction for making adjustments with each use of the liquid crystal projector as in the present invention.

The projection lens moving mechanism disclosed in the third example of the prior art has the problem of bulky and heavy construction.

The reason for this is that it is provided with a lead screw that is rotatably borne by the housing; a knob for rotating this lead screw; and a projection-lens holding member for supporting the projection lens having a threaded hole to be engaged with the lead screw to enable vertical movement with rotation of the lead screw.

In the projection lens moving mechanism of the fourth example of the prior art, the projection lens is semi-secured to the projector body by magnetic force or by a leaf spring. Since the projection lens is in a semi-secured state both during and after a user applies manual force to move the projection lens, this construction has the problems that adjustments relating to the force of the magnetic force or leaf spring are difficult and the secured position may in some cases be shifted by, for example, an undesirably applied external force.

The projection lens moving mechanism of the fifth example of the prior art uses a link mechanism to shift the position of projection on the screen by means of a motor. This example therefore has the problems that the structure of the moving mechanism is bulky, heavy, and moreover, expensive.

The projection lens moving mechanism of the sixth example of the prior art has the problem of complex structure. The reason for this is that it has a construction in which a lead screw rod is rotatably attached to the housing and engages with threaded hole provided in the projection lens and in which the lead screw rod is rotated by operating a manipulation means provided on the side surface of the housing to cause vertical movement of the projection lens.

It is an object of the present invention to provide a projection lens shifting mechanism for a projector that enables two-dimensional movement of a projection lens by a simple structure and with high accuracy, that enables easy and manual operation of this two-dimensional movement by way of a simple user interface, and that thus solves the above-described problems of the prior art.

SUMMARY OF THE INVENTION

To achieve the above-described objects, the projection lens shifting mechanism of the present invention is provided in a projector apparatus for projecting a light beam from a light source onto a screen by way of a projection lens to make an enlarged projection of an image rendered on a display device; the projection lens shifting mechanism comprises:

a base plate secured to the housing of the projection lens shifting mechanism, provided with a guide surface that is parallel to the display surface of the display device;

a moveable plate capable of rigidly holding the projection lens, and, when in a moveable state, moving in a prescribed direction parallel to the display surface of the display device while being guided by the guide surface of the base plate;

a holding plate linked to the moveable plate by way of elastic members; constituting, together with the moveable plate, an elastic clamping structure that holds the base plate from both sides with the base plate interposed between the holding plate and the moveable plate and that clamps the base plate by means of the elastic force of the elastic members; and, when an external force works against the elastic force to release the clamping, being rendered moveable to move integrally with the moveable plate in a direction parallel to the guide surface of the base plate;

an engagement structure that is interposed between the holding plate and the base plate, the engagement structure, when the clamping structure is clamping the base plate, engaging the holding plate with the base plate to place the holding plate in a locked state, i.e., a state in which the holding plate cannot move with respect to the base plate in a direction parallel to the guide surface of the base plate; and an engagement-release structure for releasing the engagement brought about by the engagement structure and switching the holding plate from the locked state to a moveable state.

Here, "a direction parallel to the guide surface" means "a direction included in a plane parallel to the guide surface".

The projection lens shifting mechanism of the present invention thus adopts a construction in which elastic members are used to constantly press the moveable plate against the base plate. This construction is able to prevent tilting of the projection lens both when in the locked state and when in the moveable state and is therefore able to, for example, prevent deterioration of resolution.

The clamping structure is preferably provided with elastic members and securing screws that are screwed from the side of said holding plate into threaded holes formed in the moveable plate through through-holes provided in said base plate; the elastic members being arranged between the heads of the securing screws and the holding plate to press the holding plate normally toward the base plate.

The elastic member may be a coil spring.

The engagement structure comprises friction members provided on the holding plate and protrusions provided at positions on the surface of said base plate that confront said friction members.

The friction members may be rubber members bonded to the holding plate.

The engagement-release structure preferably comprises a right-angle lever structure that has an axis of rotation included in a plane perpendicular to the optical axis of the projection lens to generate output torque that makes a right angle with respect to input torque.

The right-angle lever structure preferably comprises:

a first lever having an axis of rotation included in a plane perpendicular to the optical axis of said projection lens and two arms are substantially in the same plane; and a second lever having an axis of rotation included in a plane perpendicular to the optical axis of the projection lens and two arms thereof form a right angle;

the first and second levers being arranged such that:

a second arm of the second lever is arranged interposed between the holding plate and the base plate;

torque for releasing the engagement is applied to a first arm of the first lever; and the torque is transmitted to a first arm of the second lever through a second arm of the first lever.

The engagement-release structure preferably comprises two right-angle lever structures that are opposite each other across said projection lens;

the first arm of the first lever of each of the right-angle lever structures curves in a shoehorn shape to conform with the contours of the projection lens; and the first arm of the second lever engages with the holding plate, and receives the torque transmitted from the first arm of the first lever while engaging with said holding plate.

The projection lens shifting mechanism includes a rotation prevention device that guides the moveable plate along the guide surface of the base plate without rotation, the rotation prevention device having a translation structure that allows translation movement only in a vertical or in a horizontal direction with respect to the base plate, and the rotation prevention device further having a guide means that guides the moveable plate to translate in a horizontal or a vertical direction with respect to the base plate.

The adoption of this configuration enables the constitution of a simple user interface for moving and holding the projection lens by means of the minimum necessary construction wherein the moveable plate becomes movable by grasping the lever members, provided opposite across the projection lens, with the hands so as to clasp the projection lens, following which the moveable plate is held at a desired position by releasing the grasp on the lever members. In addition, since the focus ring and zoom ring are clasped and held by the lever structure when the projection lens is being moved, the focus ring and zoom ring do not move and do not require readjustment after the projection lens has been moved.

Explanation next regards the operation of the projection lens shifting mechanism of the present invention.

Friction members are bonded to the holding plate, and a powerful friction force is produced when the holding plate is pressed against the base plate, whereby the holding plate is held tightly against the base plate. The moveable plate is attached to the holding plate such that it moves integrally with the holding plate in the moveable state, and as a result, in the state in which the holding plate is pressed against the base plate and moreover the friction members on the holding plate are pressed against the base plate, the moveable plate is also held securely against the base plate.

By separating the holding plate from the base plate by means of the engagement-release structure, the friction members on the holding plate are separated from the base plate and the holding plate can be easily shifted with respect to the base plate. The moveable plate thus can easily move parallel to the guide surface of the base plate.

A construction in which the moveable plate is pressed against the guide surface of the base plate both when being held immobile and when in a moveable state can prevent the inclination of the projection lens at all times and thereby prevent problems such as deterioration of resolution. In addition, since the focus ring and zoom ring are clasped between and held by the lever members during movement of the projection lens, rotation of the focus ring and zoom ring can be prevented and no changes occur in the state of focus and zoom before and after movement of the projection lens.

The above and other objects, features, and advantages of the present invention will become apparent from the following description referring to the accompanying drawings, which illustrate examples of preferred embodiments of the present invention.

DETAILED DESCRIPTION OF THE PREFERRED EMBODIMENTS

Figure 1A:
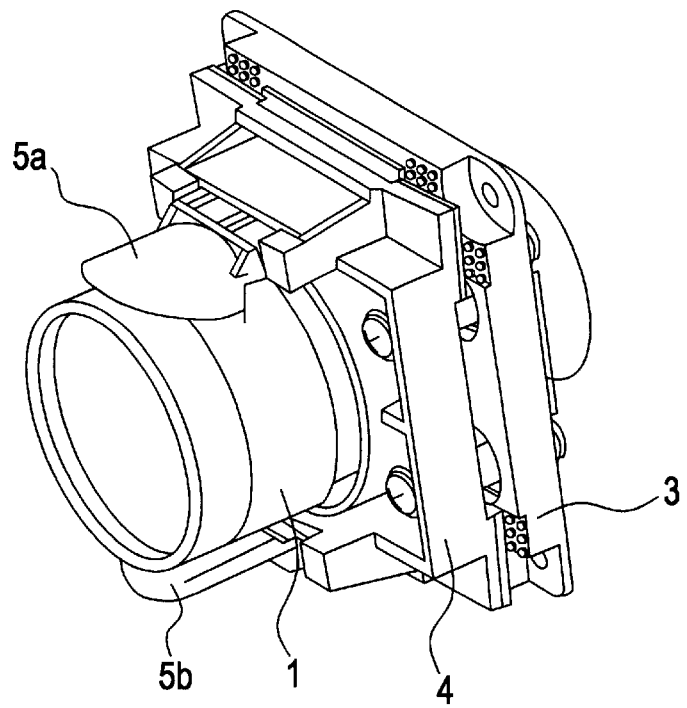
FIGS. 1(a) and (b) show a front perspective and rear perspective view of the projection lens shifting mechanism according to the first embodiment of the present invention.
Figure 1B:
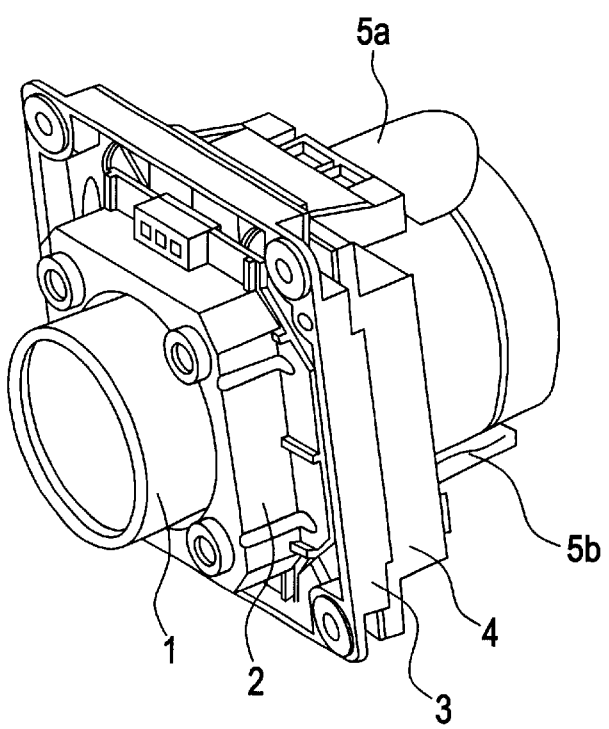

The present invention is next described in detail with reference to the accompanying drawings. We refer first to FIG. 1, in which the projection lens shifting mechanism according to the first embodiment of the present invention is shown as seen obliquely from the front in FIG. 1(a) and as seen obliquely from the rear in FIG. 1(b).

The projection lens shifting mechanism of this embodiment is a projection lens shifting mechanism for projecting a light beam from a light source such as a lamp onto a screen by way of a projection lens to make an enlarged projection of an image rendered on a display device. The display device in this embodiment is a liquid crystal display panel.

The projection lens shifting mechanism is provided with moveable plate 2, base plate 3, holding plate 4, and levers 5.

Base plate 3 is fixed to the housing (not shown in the figure) of the projection lens shifting mechanism, and has a guide surface that is parallel to the display surface of the display device (not shown in the figure).

Moveable plate 2 fixedly holds projection lens 1, and when not in a locked state (cf. description below), is guided by base plate 3 and is able to move in any direction within a plane that is parallel to the display surface of the display device.

Holding plate 4 is linked to moveable plate 2 by way of elastic members and, together with moveable plate 2, constitutes an elastic clamp structure. This clamp structure normally clamps base plate 3 from both sides of base plate 3 by means of the elasticity of the elastic members. Moveable plate 2 and holding plate 4 are therefore pressed by base plate 3 because of the reaction to this clamping force.

Since moveable plate 2 and holding plate 4 together constitute an "elastic" clamp structure with respect to base plate 3 as described above, the relative positions of holding plate 4 and moveable plate 2 can thus be elastically varied in a direction toward base plate 3 or away from base plate 3, i.e., in a direction perpendicular to the surface of base plate 3. However, as will be described hereinbelow, moveable plate 2 and holding plate 4 move as a rigid body when moving in a direction parallel to the guide surface of base plate 3.

When the clamping structure is clamping base plate 3, holding plate 4 and base plate 3 contact each other by way of an engagement (friction engagement or form engagement) structure. This engagement structure is constituted such that sufficient slide resistance acts between holding plate 4 and base plate 3. The term "sufficient slide resistance" means resistance against sliding so high that any operation of the projector may not cause unintentional displacement of holding plate 4 in a direction parallel to the guide surface of base plate 3 when the clamp structure is clamping base plate 3 by elastic force. Since holding plate 4 and moveable plate 2 move together as a rigid body so far as the movement in a direction parallel to the guide surface of base plate 3 is concerned, moveable plate 2 is locked to prohibit the movement at the same time when holding plate 4 is locked to prevent the movement.

The state in which moveable plate 2 and holding plate 4 are each pressed against base plate 3 to be unable to move is referred to as the "locked state" in the following description.

When moveable plate 2 is to be moved with respect to base plate 3, the locked state of the clamp structure is released. The release of this locked state is realized by exerting an externally applied force in a direction against the previously described elastic force to disengage holding plate 4 from base plate 3. Since the liquid crystal display panel is secured to the housing of the projector apparatus, displacement of moveable plate 2 with respect to base plate 3 therefore causes displacement of the projected picture on the screen.

Levers 5 (5a and 5b) each are levers of a pair of lever structures on the side on which the user carries out manual operation. As will be explained with reference to FIGS. 2, 3, and 4, these levers serve the purpose of switching between the locked state and the moveable state of holding plate 4, and consequently, the locked state and moveable state of moveable plate 2.

Each of levers 5a and 5b constitutes a right-angle lever structure together with a respective other lever (levers 6a and 6b described hereinbelow). The rotational axes (fulcrums) of these levers 5a and 5b are in a plane perpendicular to the optical axis of projection lens 1.

Accordingly, when torque is applied to the arms of levers 5a and 5b, the arms of levers 5a and 5b move in a direction either toward or away from the optical axis of projection lens 1.

One arm of each of the other levers (levers 6a and 6b described hereinbelow) that constitute right-angle lever structures together with levers 5a and 5b is arranged between base plate 3 and holding plate 4. When levers 5a and 5b undergo torque in the direction that approaches the optical axis of projection lens 1, these other levers generate torque in the direction that separates holding plate 4 from base plate 3.

When these levers 5a and 5b are grasped by the hand to apply torque, holding plate 4 is separated from base plate 3 (refer to FIG. 4(b) described hereinbelow), whereby the locked state of holding plate 4 is released and moveable plate 2 is thus able to move with respect to base plate 3 (and thus, with respect to the liquid crystal display panel) in any direction within a plane that is parallel to the guide surface of base plate 3.

Figure 2:
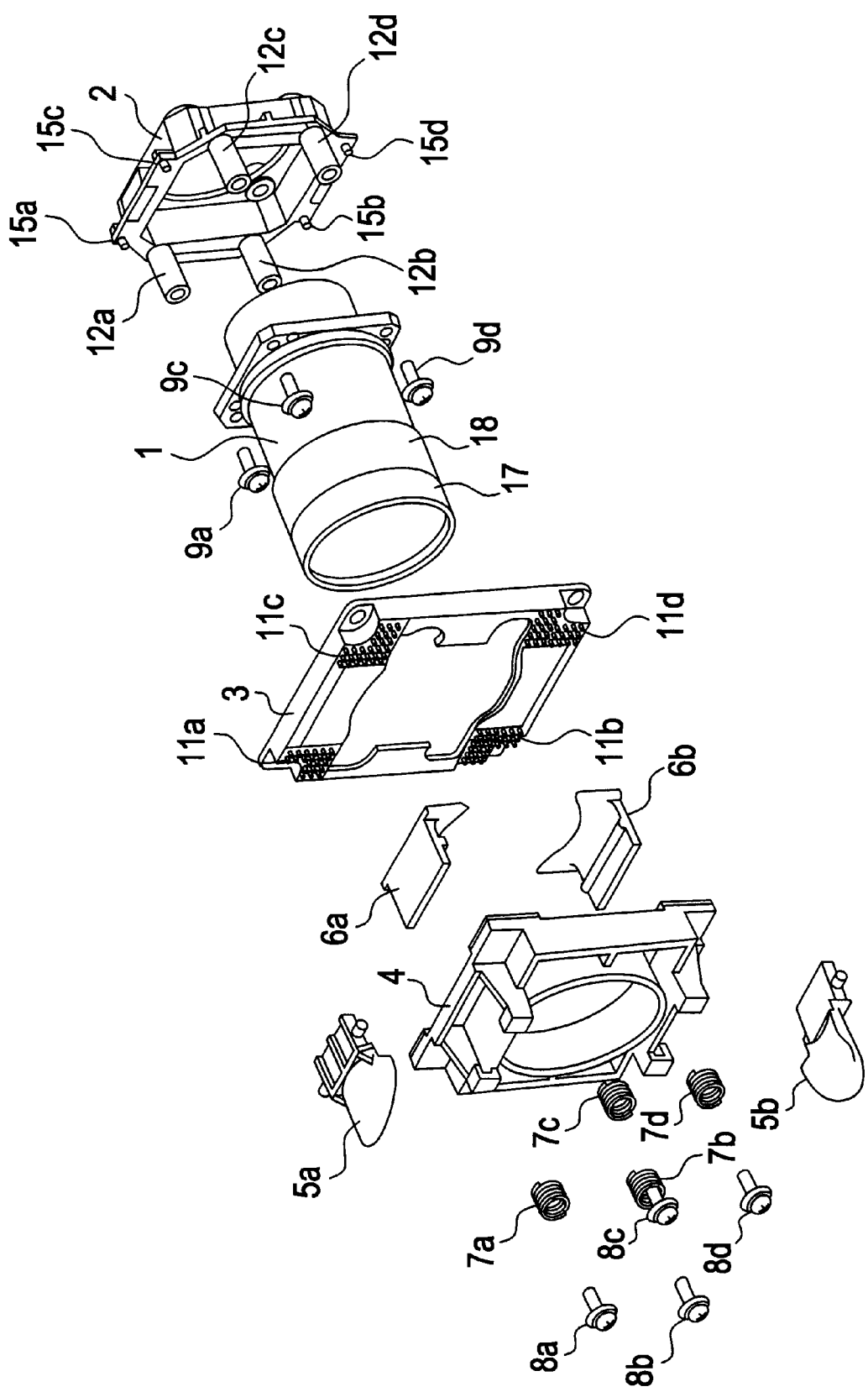
FIG. 2 is an exploded front perspective view of the projection lens shifting mechanism according to the first embodiment of the present invention.
Figure 3:
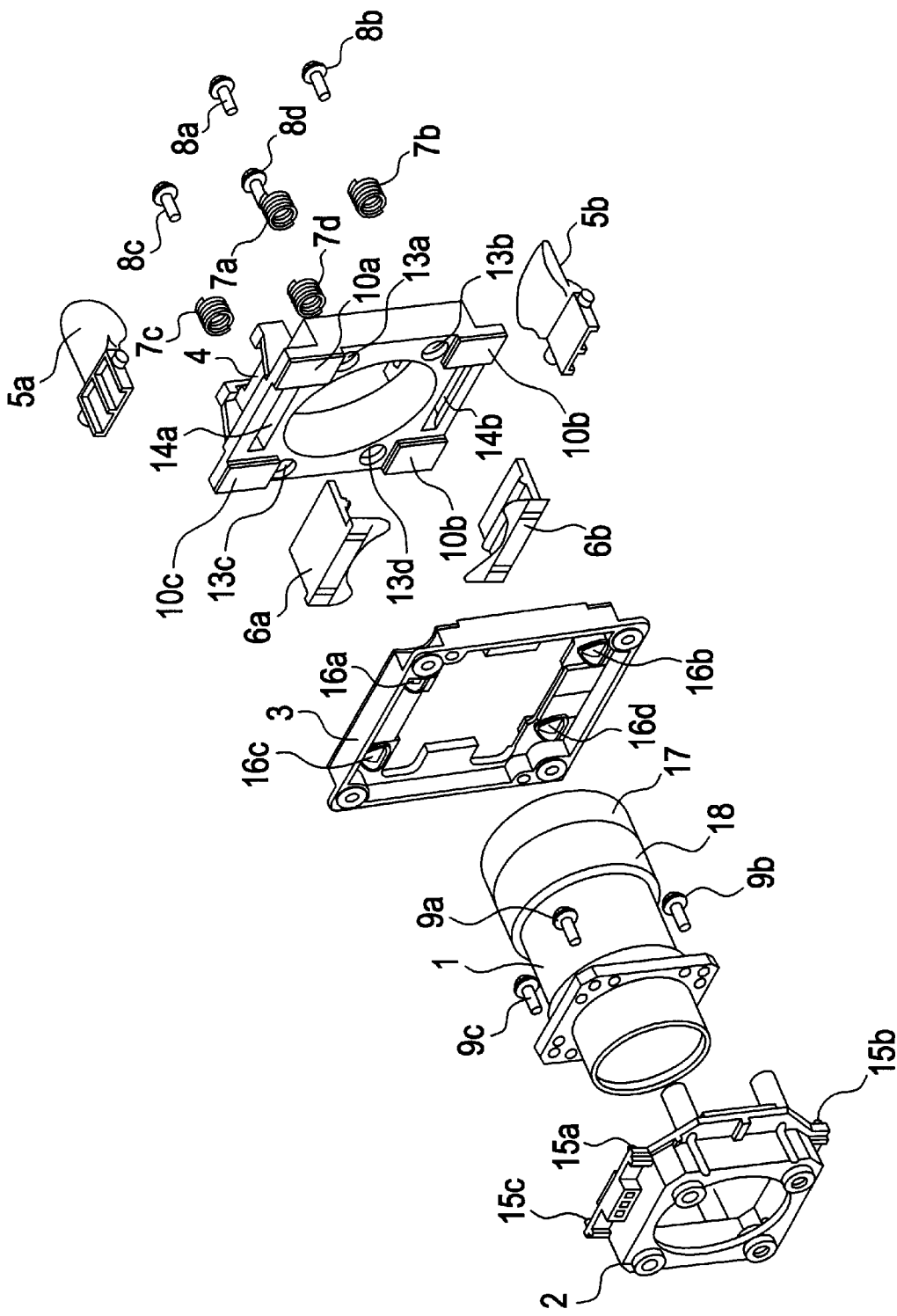
FIG. 3 is an exploded rear perspective view of the projection lens shifting mechanism according to the first embodiment of the present invention.

The construction of the projection lens shifting mechanism of the first embodiment is next described using an exploded perspective view. FIG. 2 is an exploded view of the projection lens shifting mechanism of the first embodiment as seen obliquely from the front, and FIG. 3 is a exploded view of the projection lens shifting mechanism of the first embodiment as seen obliquely from the rear. As shown in FIGS. 2 and 3, projection lens 1 is provided with focus ring 17 and zoom ring 18, and rotating these rings allows adjustment of the state of focus and zoom.

Projection lens 1 is attached to moveable plate 2 by means of securing screws 9a–9d. Moveable plate 2 includes an opening through which projection lens 1 passes, and is provided with bosses 12a–12d and pins 15a–15d. Bosses 12a–12d are formed with their axial directions perpendicular to the guide surface of base plate 3.

Moveable plate 2 and holding plate 4 elastically press base plate 3 with base plate 3 interposed between moveable plate 2 and holding plate 4. This clamp structure is realized through the use of coil springs 7a–7d and securing screws 8a–8d. Securing screws 8a–8d pass from the side of holding plate 4 through through-holes provided in holding plate 4 and base plate 3 and screw into threaded holes that are provided in moveable plate 2. Coil springs 7a–7d are arranged between the heads of securing screws 8a–8d on the side of holding plate 4 and base plate 3. In this arrangement, when securing screws 8a–8d are screwed into the threaded holes in moveable plate 2, holding plate 4 is pressed and locked against base plate 3 by the elastic force of coil springs 7a–7d.

In this arrangement, when the user grasps levers 5a and 5b with a hand to apply torque, the relative positions of moveable plate 2 and base plate 3 remain unchanged because of the elastic force of coiled springs 7a–7d despite the separation of holding plate 4 from base plate 3. Accordingly, the separation between projection lens 1 and the liquid crystal display panel in the direction of the optical axis remains unchanged despite the switching from the locked state to the unlocked state (moveable state) of holding plate 4.

Bosses 12a–12d of moveable plate 2 are inserted into holes 13a–13d of holding plate 4 with minimal play. This allows moveable plate 2 and holding plate 4 to move integrally with respect to base plate 3 in any direction parallel to the guide surface of base plate 3 when the locked state of holding plate 4 is released and holding plate 4 becomes moveable.

Pins 15a–15d fit into depressions 16a–16d of base plate 3, as will be explained hereinbelow.

Friction members 10a–10d composed of, for example, rubber are bonded to holding plate 4 at positions that confront protrusions 11a–11d provided in base plate 3. In the locked state of holding plate 4, these friction members 10a–10d are pressed against protrusions 11a–11d. These protrusions 11a–11d and friction members 10a–10d constitute the previously described engagement structure.

The lever structure for switching between the locked state and unlocked state of holding plate 4 is constituted by: first levers 5a and 5b, each able to rotate around rotational axes perpendicular to the optical axis of projection lens 1 and fixed to holding plate 4; and second levers 6a and 6b, each able to rotate around moveable rotational axes perpendicular to the optical axis. Lever 5a and lever 6a constitute the first lever structure, and lever 5b and lever 6b constitute the second lever structure.

Levers 6a and 6b each constitute a right-angle lever in which the arms of each lever form a right angle, one arm (the first arm) passing through respective one of openings 14a and 14b provided in holding plate 4, the other arm (the second arm) being interposed between holding plate 4 and base plate 3. The first arm of each of levers 6a and 6b is engaged with respective one of openings 14a and 14b. The moveable axes of rotation of levers 6a and 6b can slide along the surface areas of base plate 3 that face openings 14a and 14b.

When torque is applied to the first arms of levers 6a and 6b in the direction away from the optical axis, torque is produced in the second arm so as to push holding plate 4 in the direction away from base plate 3. As a result, holding plate 4 moves away from base plate 3 against the elastic force of coil springs 7a–7d (refer to FIG. 4 described hereinbelow). Holding plate 4 is thus switched from the locked state to the unlocked state. When holding plate 4 switches from the locked state to the unlocked state, the moveable rotational axes of levers 6a and 6b each move slightly downward along the surfaces of base plate 3 that confront openings 14a and 14b.

As shown in FIG. 2, first lever pair 5a and 5b are provided with first arms that curve in a shoehorn shape and second arms that transmit torque to the respective first arms of second lever pair 6a and 6b. As will later be explained, when each of the portions that curve in a shoehorn shape is grasped by hand to apply torque toward the optical axis of projection lens 1, torque is generated in the direction away from the optical axis in each of the second arms of levers 5a and 5b. This torque is transmitted to the first arm of each lever 6a, 6b, whereby holding plate 4 is switched to the unlocked state. This projection lens shifting mechanism is fixed to the housing of the projector apparatus by way of base plate 3.

The operation of the projection lens shifting mechanism of the first embodiment of the present invention will next be explained.

Figure 4A:
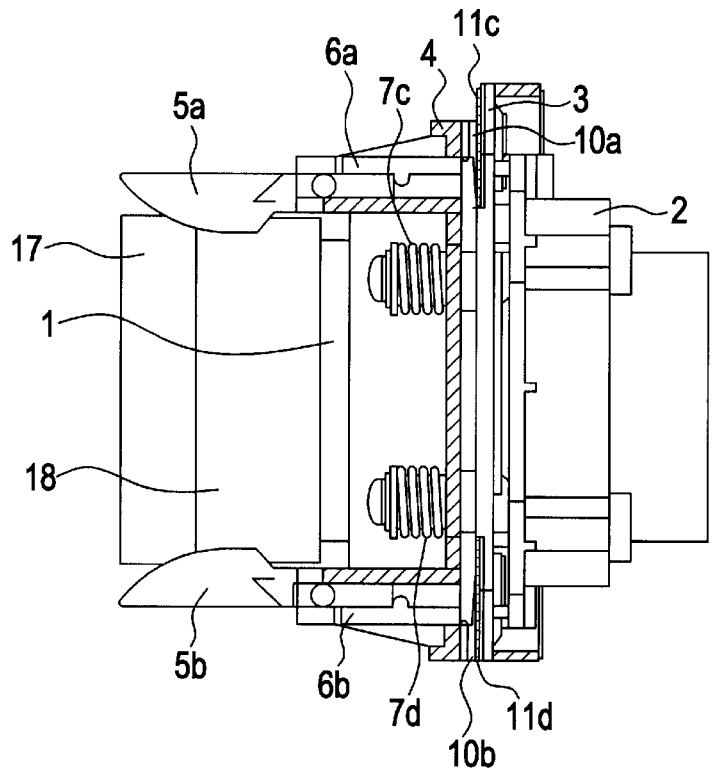
FIGS. 4(a) and (b) show side views, partially in section, of the projection lens shifting mechanism according to the first embodiment of the present invention, FIG. 4(a) showing the locked state and FIG. 4(b) showing the moveable state.

FIG. 4(a) shows the projection lens shifting mechanism in the locked state as seen from the side partially in section. Friction members 10a–10d are bonded to holding plate 4 and pressed against protrusions 11a–11d of base plate 3 under the elastic force of coil springs 7a–7d, whereby a large friction force is produced and a state is realized in which holding plate 4 and moveable plate 2 are held immobile with respect to base plate 3.

Figure 4B:
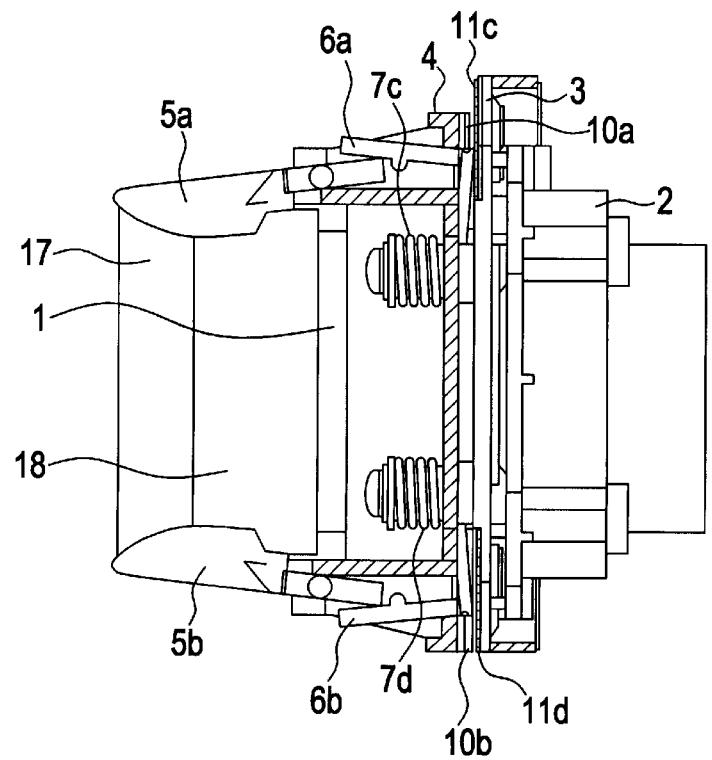

In FIG. 4(b), on the other hand, the projection lens shifting mechanism is shown in the moveable state as seen from the side partially in section. Grasping the portions of levers 5a and 5b curved in a shoehorn shape and pushing them toward the projection lens cause levers 6a and 6b to rotate. In accordance with the principle of the lever, the rotation of levers 6a and 6b in turn causes holding plate 4 to move in a direction away from base plate 3. The movement of holding plate 4 causes friction members 10a–10d, bonded to holding plate 4, to separate from protrusions 11a–11d of base plate 3. The strong friction force that has acted in the locked state is thus cancelled, and holding plate 4 and moveable plate 2 can easily move with respect to base plate 3. Letting go of levers 5a and 5b re-establishes the locked state shown in FIG. 4(a) and holding plate 4 and moveable plate 2 are thus held at the existing positions.

While the projection lens is being moved, focus ring 17 and zoom ring 18 are taken hold of between levers 5a and 5b, whereby the rotation of focus ring 17 and zoom ring 18 can be prevented and alteration of the focus and zoom state before and after movement of the projection lens can be obviated.

In addition, as explained in the foregoing description, pins 15a–15d are provided in moveable plate 2. These pins 15a–15d are put into depressions 16a–16d of base plate 3 so that moveable plate 2 can move in any direction parallel to the guide surface of base plate 3 as long as pins 15a–15d are not dislodged from depressions 16a–16d in base plate 3. The range of the movement of moveable plate 2 can thus be limited.

The projection lens shifting mechanism of the first embodiment of the present invention thus can provide a simple and highly accurate structure for adjusting the position of a projection lens in any direction in a plane parallel to the display surface of the display device.

Explanation next regards the second embodiment of the present invention.

Figure 5:
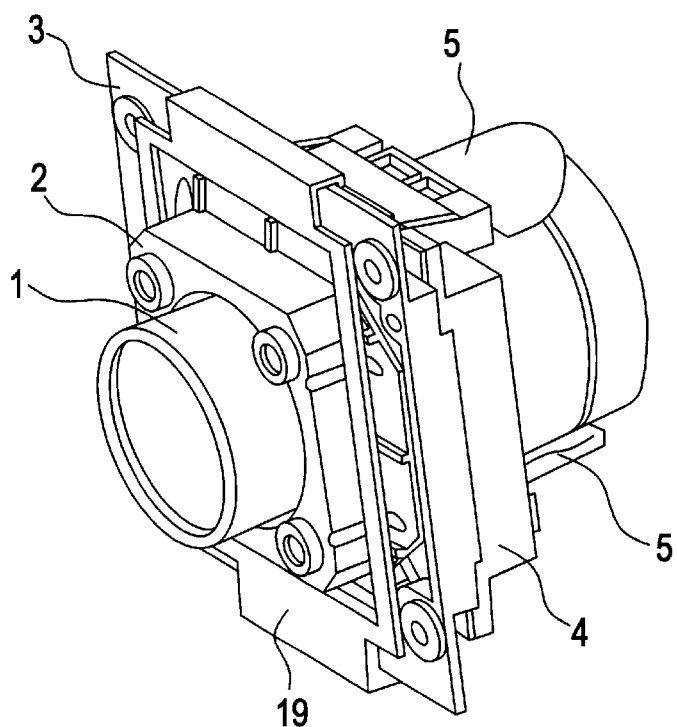
FIG. 5 shows a rear perspective view of the projection lens shifting mechanism according to the second embodiment of the present invention.
Figure 6:
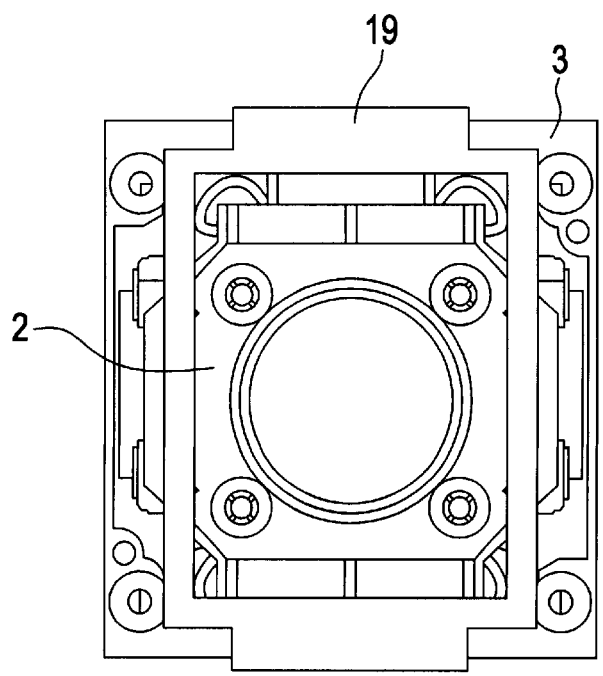
FIG. 6 shows a rear view of the projection lens shifting mechanism according to the second embodiment of the present invention.

FIG. 5 shows the projection lens shifting mechanism according to the second embodiment of the present invention as seen obliquely from the rear, and FIG. 6 shows the projection lens shifting mechanism according to the second embodiment of the present invention as seen from the rear. This second embodiment differs from the above-described first embodiment in that it is provided with a rotation stop. In other words, the projection lens shifting mechanism of this embodiment is provided with: moveable plate 2, base plate 3, holding plate 4, lever structures 5, and rotation stop 19.

Moveable plate 2 fixedly holds projection lens 1 and is capable of movement in any direction in a plane that is parallel to the display surface of the display device when in the unlocked state. Base plate 3 is secured to the projector housing.

Holding plate 4 constitutes a structure that holds moveable plate 2 immobile with respect to base plate 3 when in the locked state, by employing engagement structure (friction- or form-engagement mechanism) and that releases the friction- or form-engagement mechanism to allow easy movement of moveable plate 2 with respect to base plate 3 when in the unlocked state. Lever structures 5 are interposed between holding plate 4 and base plate 3 for switching between the locked state and unlocked state of holding plate 4, as described above. Rotation stop 19 is held on base plate 3 so as to allow translation movement of the stop 19 in the right or left direction as seen in the direction of the optical axis of the projection lens 1.

In order to attain this structure, rotation stop 19 has a slide structure, which holds the upper edge portion and lower edge portion of base plate 3 so as to allow only translation movement in a prescribed direction, normally the horizontal direction parallel to the liquid crystal display surface. An opening having vertical sidewalls is provided in rotation stop 19. The side edges of moveable plate 2 are formed to allow sliding along the vertical sidewalls of the opening.

This structure of rotation stop 19 allows translation movement of movable plate 2 in a desired direction parallel to the display surface of the display device without rotation with respect to base plate 3.

While a rotation stop is shown in FIGS. 5 and 6 that holds the upper edge portion and lower edge portion of base plate 3 to allow only translation movement in a horizontal direction, an alternative rotation stop can also be satisfactorily employed that holds the left and right vertical edges of base plate 3 so as to allow only translation movement in a vertical direction and is provided with an opening with horizontally extending sidewalls for guiding translation movement of moveable plate 2 in a horizontal direction.

The above-decribed second embodiment has the merit that it not only attains the same effect as the above-described first embodiment, but also enables vertical and horizontal movement of the moveable plate without rotation with respect to the base plate.

Explanation next regards the third embodiment of the present invention with reference to FIG. 7. This embodiment adds the ability to increase the pressure (hereinbelow referred to as "increased clamping") caused by coil springs 7a–7d in the above-described first embodiment by means of adjustment screws, thereby increasing the force that presses the friction members against the protrusions of base plate 3.

Figure 7A:
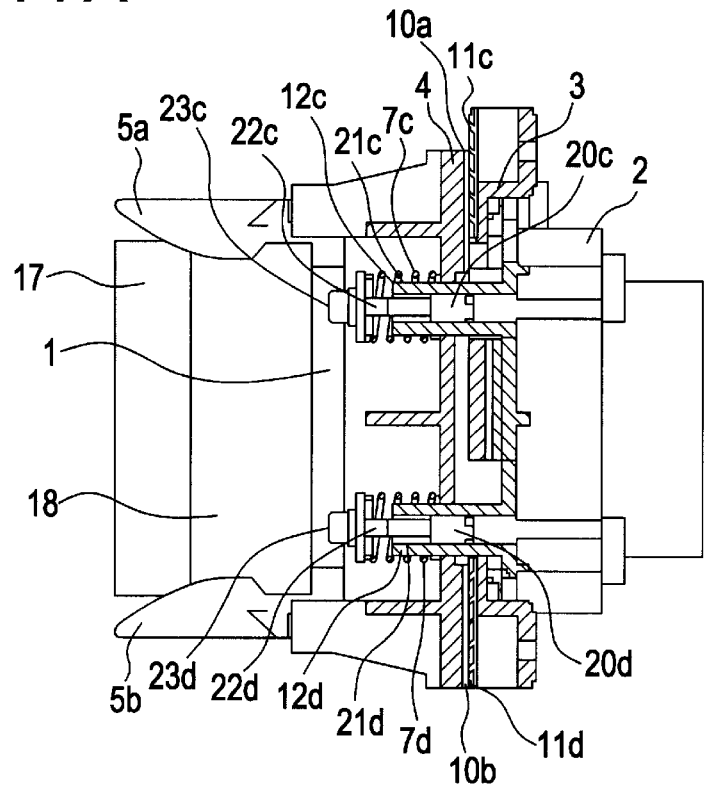
FIG. 7(a) shows a side view, partially in section, of the projection lens shifting mechanism in the normally locked state.
Figure 7B:
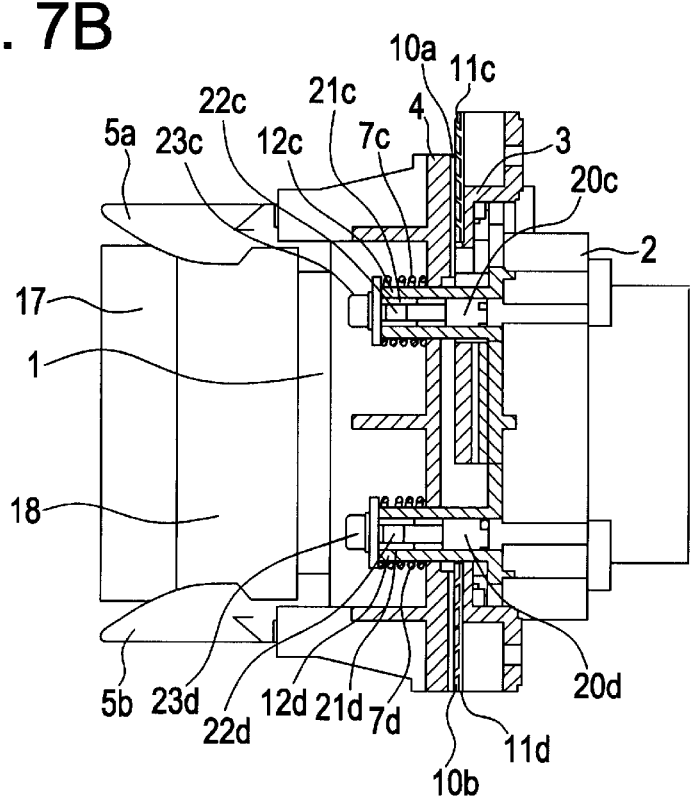
FIG. 7(b) shows a side view, partially in section, of the projection lens shifting mechanism in a locked state in which the holding force has been increased by means of increased clamping according to the third embodiment of the present invention.

FIG. 7(a) is a side view of the projection lens shifting mechanism in the normally locked state represented partially in section, and FIG. 7(b) is a side view, partially in section, of the projection lens shifting mechanism in the locked state in which the holding force is increased by this increased clamping.

Referring now to FIG. 7(a), adjustment screws 23c and 23d pass through the insert nuts 21c and 21d inside bosses 12c and 12d, with the tips thereof affixed to nuts 20c and 20d such that adjustment screws 23c and 23d may not come off from bosses 12c and 12d. When threaded portions 22c and 22d of adjustment screws 23c and 23d are tightened into insert nuts 21c and 21d in bosses 12c and 12d, coil springs 7c and 7d are further compressed from the state shown in FIG. 7(a) to the state shown in FIG. 7(b), and friction members 10a and 10b bonded to holding plate 4 are pressed with stronger force against protrusions 11c and 11d of base plate 3 than in the locked state of the first embodiment. A high level of friction force is therefore produced between the friction members of holding plate 4 and the protrusions of base plate 3. In this way, holding plate 4 and moveable plate 2 are held immobile with respect to base plate 3.

It is to be understood, however, that although the characteristics and advantages of the present invention have been set forth in the foregoing description, the disclosure is illustrative only, and changes may be made in the shape, size, and arrangement of the parts within the scope of the appended claims.

What is claimed is:

1. A projection lens shifting mechanism provided in a projector apparatus for projecting a light beam from a light source onto a screen by way of a projection lens to make an enlarged projection of an image rendered on a display device; said projection lens shifting mechanism comprising:

a base plate secured to the housing of said projection lens shifting mechanism, provided with a guide surface that is parallel to the display surface of said display device;

a moveable plate capable of rigidly holding said projection lens, and, when in a moveable state, moving in a prescribed direction parallel to the display surface of said display device while being guided by said guide surface of said base plate;

a holding plate linked to said moveable plate by way of elastic members; constituting, together with said moveable plate, an elastic clamping structure that holds said base plate from both sides with said base plate interposed between said holding plate and said moveable plate and that clamps said base plate by means of the elastic force of said elastic members; and, when an external force works against said elastic force to release the clamping, being rendered moveable to move integrally with said moveable plate in a direction parallel to said guide surface of said base plate;

an engagement structure that is interposed between said holding plate and said base plate, said engagement structure, when said clamping structure is clamping said base plate, engaging said holding plate with said base plate to place said holding plate in a locked state, i.e., a state in which said holding plate cannot move with respect to said base plate in a direction parallel to the guide surface of said base plate; and an engagement-release structure for releasing the engagement brought about by said engagement structure and switching said holding plate from said locked state to a moveable state.

2. A projection lens shifting mechanism according to claim 1, wherein said clamping structure is provided with elastic members and securing screws that are screwed from the side of said holding plate into threaded holes formed in said moveable plate through through-holes provided in said base plate; said elastic members being arranged between the heads of said securing screws and said holding plate to elastically press said holding plate normally toward said base plate.

3. A projection lens shifting mechanism according to claim 2, wherein said elastic members are coil springs.

4. A projection lens shifting mechanism according to claim 1, wherein said engagement structure comprises friction members provided on said holding plate and protrusions provided at positions on the surface of said base plate that confront said friction members.

5. A projection lens shifting mechanism according to claim 4, wherein said friction members are rubber members bonded to said holding plate.

6. A projection lens shifting mechanism according to claim 1, wherein said engagement-release structure comprises a right-angle lever structure that has an axis of rotation included in a plane perpendicular to the optical axis of said projection lens to generate output torque that makes a right angle with respect to input torque.

7. A projection lens shifting mechanism according to claim 6, wherein said right-angle lever structure comprises:

a first lever having an axis of rotation included in a plane perpendicular to the optical axis of said projection lens and two arms are substantially in the same plane; and a second lever having an axis of rotation included in a plane perpendicular to the optical axis of said projection lens and two arms thereof form a right angle;

said first and second levers being arranged such that:

a second arm of said second lever is arranged interposed between said holding plate and said base plate;

torque for releasing said engagement is applied to a first arm of said first lever; and said torque is transmitted to a first arm of said second lever through a second arm of said first lever.

8. A projection lens shifting mechanism according to claim 7, wherein:

said engagement-release structure comprises two right-angle lever structures that are opposite each other across said projection lens;

the first arm of the first lever of each of said right-angle lever structures curves in a shoehorn shape to conform with the contours of said projection lens; and the first arm of the second lever engages with said holding plate, and receives the torque transmitted from the first arm of said first lever while engaging with said holding plate.

9. A projection lens shifting mechanism according to claim 1, wherein said projection lens shifting mechanism includes a rotation prevention device that guides said moveable plate along said guide surface of said base plate without rotation, said rotation prevention device having a translation structure that allows translation movement only in a vertical or in a horizontal direction with respect to said base plate, and said rotation prevention device further having a guide means that guides said moveable plate to translate in a horizontal or a vertical direction with respect to said base plate.

* * * * *